(12) United States Patent
Fujimoto

(10) Patent No.: US 9,400,949 B2
(45) Date of Patent: Jul. 26, 2016

(54) DISPLAY DEVICE AND IMAGE FORMING APPARATUS CAPABLE OF SWITCHING A DISPLAY LANGUAGE OF AN AUTHENTICATION SCREEN TO A DISPLAY LANGUAGE OF A USER

(71) Applicant: KYOCERA Document Solutions Inc., Osaka-shi, Osaka (JP)

(72) Inventor: Norie Fujimoto, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/430,588

(22) PCT Filed: May 21, 2014

(86) PCT No.: PCT/JP2014/063500
§ 371 (c)(1),
(2) Date: Mar. 24, 2015

(87) PCT Pub. No.: WO2015/015875
PCT Pub. Date: Feb. 5, 2015

(65) Prior Publication Data
US 2015/0294206 A1    Oct. 15, 2015

(30) Foreign Application Priority Data

Jul. 30, 2013  (JP) ................................. 2013-158104

(51) Int. Cl.
*G06K 15/00*  (2006.01)
*B41J 29/00*  (2006.01)
(Continued)

(52) U.S. Cl.
CPC ............. *G06K 15/4095* (2013.01); *B41J 29/00* (2013.01); *B41J 29/38* (2013.01); *B41J 29/42* (2013.01);
(Continued)

(58) Field of Classification Search
None
See application file for complete search history.

(56) References Cited

U.S. PATENT DOCUMENTS

2006/0126100 A1    6/2006  Jung
2006/0241933 A1   10/2006  Franz
(Continued)

FOREIGN PATENT DOCUMENTS

CN    1790221       6/2006
JP    2005-151415   6/2005
(Continued)

OTHER PUBLICATIONS

European Search Report dated Oct. 14, 2015.
(Continued)

*Primary Examiner* — King Poon
*Assistant Examiner* — Andrew H Lam
(74) *Attorney, Agent, or Firm* — Gerald E. Hespos; Michael J. Porco; Matthew T. Hespos

(57) ABSTRACT

In a state in which an authentication screen in any one display language of a plurality of display languages is displayed, every time a predetermined number of characters are input to an ID input field, an ID including the characters input to the ID input field in order from a first-input is retrieved from user data. Ids, obtained as a result of the retrieval, are set as candidate IDs. When all display languages selected by users having the candidate IDs are the same, the display language selected by the users having the candidate IDs is set as a first display language. When a display language of an authentication screen, which is being displayed, does not coincide with the first display language, an authentication screen in the first display language is displayed in place of the authentication screen, which is being displayed.

15 Claims, 10 Drawing Sheets

(51) Int. Cl.
  *B41J 29/38* (2006.01)
  *B41J 29/42* (2006.01)
  *G03G 21/00* (2006.01)
  *G03G 21/04* (2006.01)
  *H04N 1/00* (2006.01)
  *G06F 9/44* (2006.01)

(52) U.S. Cl.
  CPC ............... *G03G 21/00* (2013.01); *G03G 21/04* (2013.01); *G06F 9/4443* (2013.01); *G06K 15/005* (2013.01); *H04N 1/00* (2013.01)

(56) References Cited

U.S. PATENT DOCUMENTS

| | | | | |
|---|---|---|---|---|
| 2008/0150900 A1* | 6/2008 | Han | | G06F 3/04886 345/171 |
| 2010/0010977 A1 | 1/2010 | Choi et al. | | |
| 2010/0099381 A1* | 4/2010 | Nakama | | H04B 1/3816 455/411 |
| 2014/0002850 A1 | 1/2014 | Kang | | |

FOREIGN PATENT DOCUMENTS

| | | |
|---|---|---|
| JP | 2006-26972 | 2/2006 |
| JP | 2006-235186 | 9/2006 |
| JP | 2010-263396 | 11/2010 |
| JP | 2011-136044 | 7/2011 |
| JP | 2012-59239 | 3/2012 |
| WO | 2009/008274 | 1/2009 |

OTHER PUBLICATIONS

International Search Report of Jul. 25, 2014.
Chinese Office Action Dated Nov. 6, 2015.

* cited by examiner

- 5a → AUTHENTICATION SCREEN
- 5b → ID  [　　　　]—7
- 5c → PASSWORD [　　　　]—9
- 5d → 【INFORMATION】
- 5e → HDD INITIALIZATION IS LIKELY TO TAKE TIME

| USER ID | DISPLAY LANGUAGE |
|---------|------------------|
| ⋮ | ⋮ |
| fujimoto | JAPANESE |
| ⋮ | ⋮ |

~D

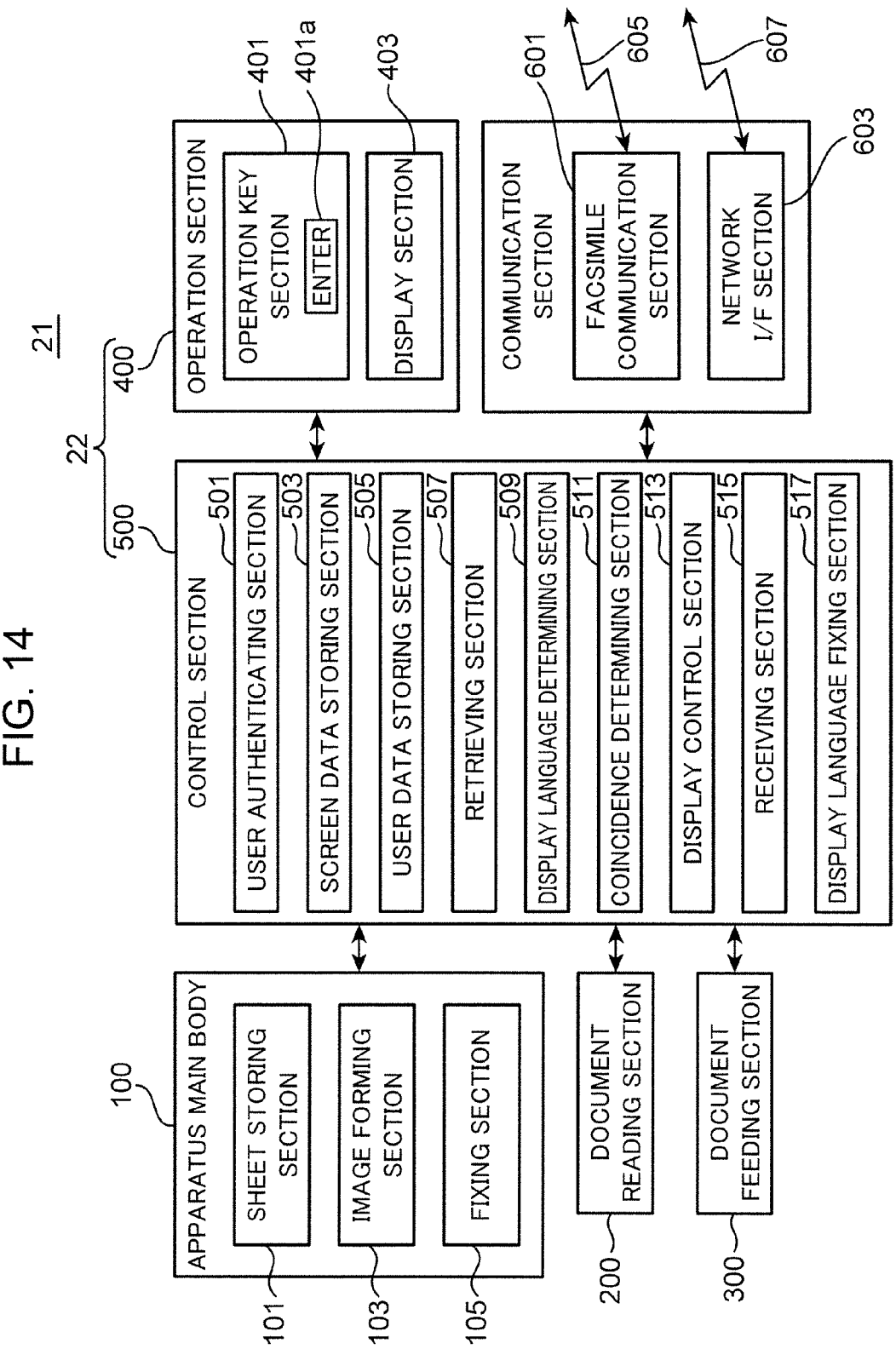

DISPLAY DEVICE AND IMAGE FORMING APPARATUS CAPABLE OF SWITCHING A DISPLAY LANGUAGE OF AN AUTHENTICATION SCREEN TO A DISPLAY LANGUAGE OF A USER

TECHNICAL FIELD

The present invention relates to a display device that can switch a display language of a screen and an image forming apparatus including the display apparatus.

BACKGROUND ART

A plurality of display languages of a screen displayed on an operation section of an image forming apparatus are prepared taking into account a situation in which users using different languages use the image forming apparatus. When a display language of the screen is not a use language of a user, it is troublesome for the user to perform operation for switching setting to a use language of the user. Therefore, there is proposed a technique for switching, when a user name is input to a screen, a display language of the screen to a language registered in advance in association with the user name (see, for example, Japanese Unexamined Patent Publication No. 2006-26972).

In an authentication screen, a notification item (e.g., a sentence such as "HDD initialization is likely to take time") is sometimes included in addition to an ID input field and a password input field. Since the notification item is displayed in a display language of the authentication screen, when the user cannot understand the display language of the authentication screen, the user cannot understand the notification item.

When the user cannot understand content of the notification item, the user feels uneasy and desires to know the content of the notification item as early as possible. Further, as indicated by the notification item of the content explained above ("HDD initialization is likely to take time"), in some case, it is better to log in later because, even if the user logs in now, it takes time until the user can use an image forming apparatus.

According to the technique explained above, the display language of the authentication screen is not switched until the user finishes inputting the user name to the authentication screen. Therefore, the user cannot understand the notification item until the user finishes inputting the user name to the authentication screen.

It is an object of the present invention to provide a display device capable of switching a display language of an authentication screen to a use language of a user as early as possible.

SUMMARY OF THE INVENTION

A display device according to the present invention that attains the object includes: a display section on which an authentication screen including an ID input field is displayed; a display control section that causes the display section to display the authentication screen; a screen data storing section that, with the authentication screen being prepared for each of a plurality of display languages, stores in advance screen data of the authentication screen for each of the plurality of display languages; a user data storing section that stores in advance user data obtained by collecting, for each of a plurality of users, data that associates a display language selected by a user out of the plurality of display languages and an ID of the users; a character input section for inputting a character to the ID input field; a retrieving section that retrieves from the user data, in a state in which the authentication screen is displayed on the display section, every time a predetermined number of characters are input to the ID input field by the character input section, the ID including the characters input to the ID input field in order from a first-input; a display language determining section that sets, as candidate IDs, the IDs obtained as a result of the retrieval and determines whether all the display languages selected by the users having the candidate IDs are the same; and a coincidence determining section that sets, when determination is made that all the display languages selected by the users having the candidate IDs are the same, the display language selected by the users having the candidate IDs as a first display language, and determines whether a display language of the authentication screen displayed on the display section coincides with the first display language, wherein when determination is not made that the display language of the authentication screen displayed on the display section coincides with the first display language, the display control section reads out, from the screen data storing section, the screen data of the authentication screen for the first display language and causes the display section to display the authentication screen for the first display language, in place of the authentication screen for the display language displayed on the display section.

In the display device according to the present invention, in the state in which the authentication screen having any one of the plurality of display languages as the display language is displayed, every time the predetermined number of characters are input to the ID input field, the ID including the characters input to the ID input field in order from a first-input are retrieved from the user data. The IDs obtained as a result of the retrieval are set as the candidate IDs. When all the display languages selected by the users having the candidate IDs are the same, the display language selected by the users having the candidate IDs is set as the first display language. When the display language of the authentication screen being displayed does not coincide with the first display language, the authentication screen for the first display language is displayed instead of the authentication screen being displayed.

As explained above, with the display device according to the present invention, even before the input of the ID to the ID input field is completed, the display language of the authentication screen can be switched to the authentication screen for the display language selected by the user. Therefore, it is possible to switch the display language of the authentication screen to the display language selected by the user, that is, a use language of the user as early as possible.

BRIEF DESCRIPTION OF DRAWINGS

FIG. 14 is a block diagram showing the configuration of an image forming apparatus including the modification of the embodiment.

DESCRIPTION OF EMBODIMENTS

Figure 1:
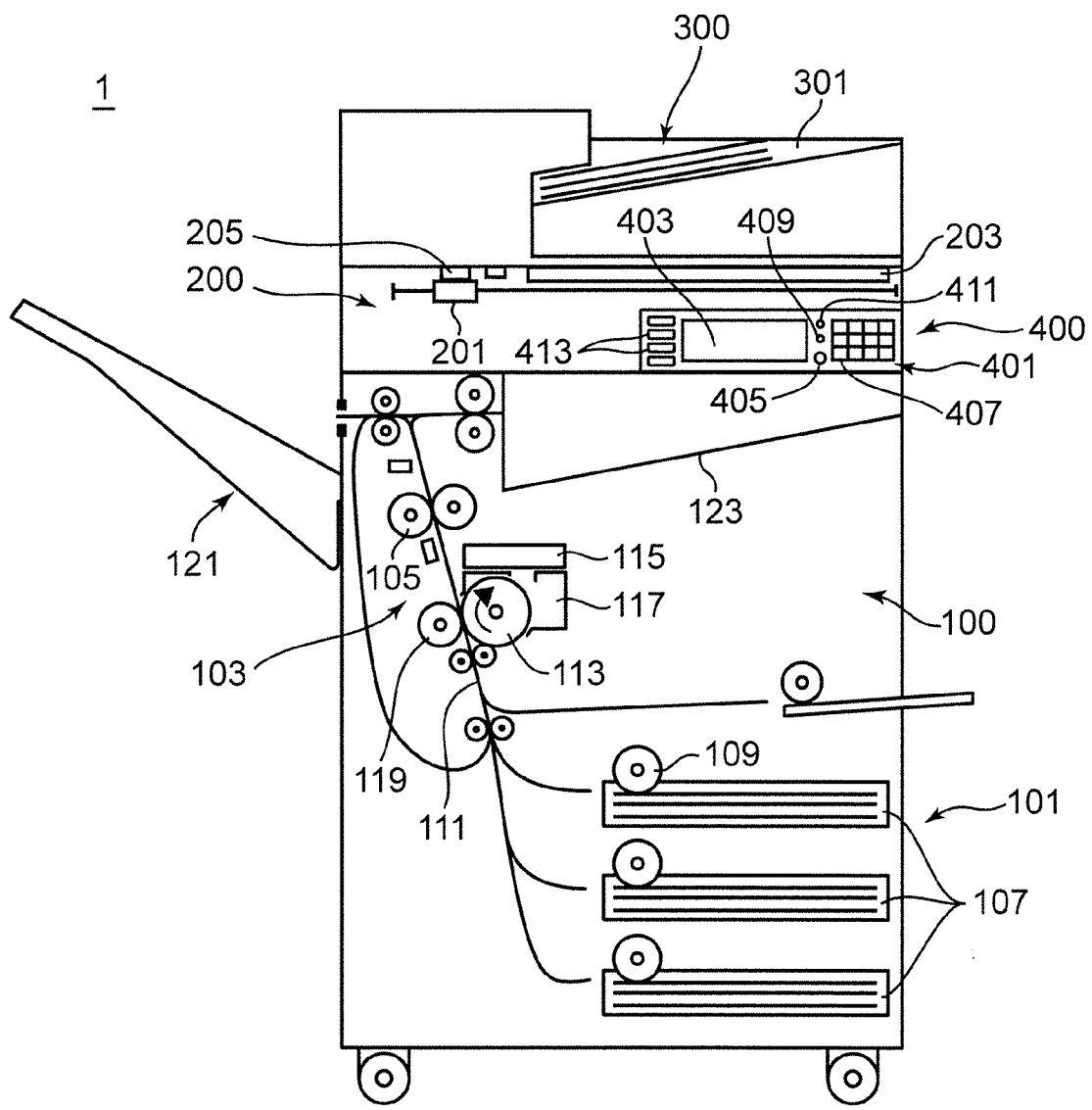
FIG. 1 is an explanatory diagram for explaining an overview of an internal structure of an image forming apparatus including a display device according to an embodiment.

An embodiment of the present invention is explained in detail below with reference to the drawings. FIG. 1 is an explanatory diagram for explaining an overview of an internal structure of an image forming apparatus 1 including a display device according to the embodiment of the present invention. The image forming apparatus 1 can be applied to, for example, a digital multifunction peripheral including functions of a copying machine, a printer, a scanner, and a facsimile. The image forming apparatus 1 includes an apparatus main body 100, a document reading section 200 arranged on the apparatus main body 100, a document feeding section 300 arranged on the document reading section 200, and an operation section 400 arranged on an upper front surface of the apparatus main body 100.

The document feeding section 300 functions as an automatic document feeder and can feed a plurality of documents placed on a document placing section 301 to enable the document reading section 200 to continuously read the documents.

The document reading section 200 includes a carriage 201 mounted with an exposure lamp or the like, a document table 203 configured by a transparent member such as glass, a not-shown CCD (Charge Coupled Device) sensor, and a document reading slit 205. When reading a document placed on the document table 203, the document reading section 200 reads the document with the CCD sensor while moving the carriage 201 in the longitudinal direction of the document table 203. On the other hand, when reading a document fed from the document feeding section 300, the document reading section 200 moves the carriage 201 to a place opposed to the document reading slit 205, causes the document fed from the document feeding section 300 to pass over the document reading slit 205, and reads the document with the CCD sensor. The CCD sensor outputs the read document as image data.

The apparatus main body 100 includes a sheet storing section 101, an image forming section 103, and a fixing section 105. The sheet storing section 101 is arranged in a lowermost part of the apparatus main body 100 and includes sheet trays 107 that can store bundles of sheets. A sheet at the top in the bundle of the sheets stored in the sheet tray 107 is delivered to a sheet conveying path 111 by driving of a pickup roller 109. The sheet is conveyed to the image forming section 103 through the sheet conveying path 111.

The image forming section 103 forms a toner image on the sheet conveyed thereto. The image forming section 103 includes a photosensitive drum 113, an exposing section 115, a developing section 117, and a transfer section 119. The exposing section 115 generates light modulated according to image data (image data output from the document reading section 200, image data transmitted from a personal computer, an image data received by facsimile, etc.) and irradiates the light on the uniformly charged circumferential surface of the photosensitive drum 113. Consequently, an electrostatic latent image corresponding to the image data is formed on the circumferential surface of the photosensitive drum 113. A toner is supplied to the circumferential surface of the photosensitive drum 113 from the developing section 117 in this state, whereby a toner image corresponding to the image data is formed on the circumferential surface. The toner image is transferred onto the sheet conveyed from the sheet storing section 101 explained above by the transfer section 119.

The sheet having the toner image transferred thereon is sent to the fixing section 105. In the fixing section 105, heat and pressure are applied to the toner image and the sheet. The toner image is fixed on the sheet. The sheet is discharged to a stack tray 121 or a paper discharge tray 123.

The operation section 400 includes an operation key section 401 and a display section 403. The display section 403 includes a touch panel function. A screen including soft keys is displayed on the display section 403. A user operates the soft keys while viewing the screen to thereby perform setting and the like necessary for execution of functions such as copying.

Operation keys formed by hard keys are provided in the operation key section 401. Specifically, for example, a start key 405, a ten key 407, a stop key 409, a reset key 411, function switching keys 413 for switching the copying machine, the printer, the scanner, and the facsimile are provided.

The start key 405 is a key for starting operations such as copying and facsimile transmission. The ten key 407 is a key for inputting numbers such as the number of copies and a facsimile number. The stop key 409 is a key for stopping a copy operation and the like halfway. The reset key 411 is a key for returning set contents to an initial setting state.

The function switching keys 413 are keys that include a copy key and a transmission key and switching a copy function, a communication function, and the like one another. If the copy key is operated, an initial screen for copying is displayed on the display section 403. If the transmission key is operated, an initial screen for facsimile transmission and mail transmission is displayed on the display section 403.

Figure 2:
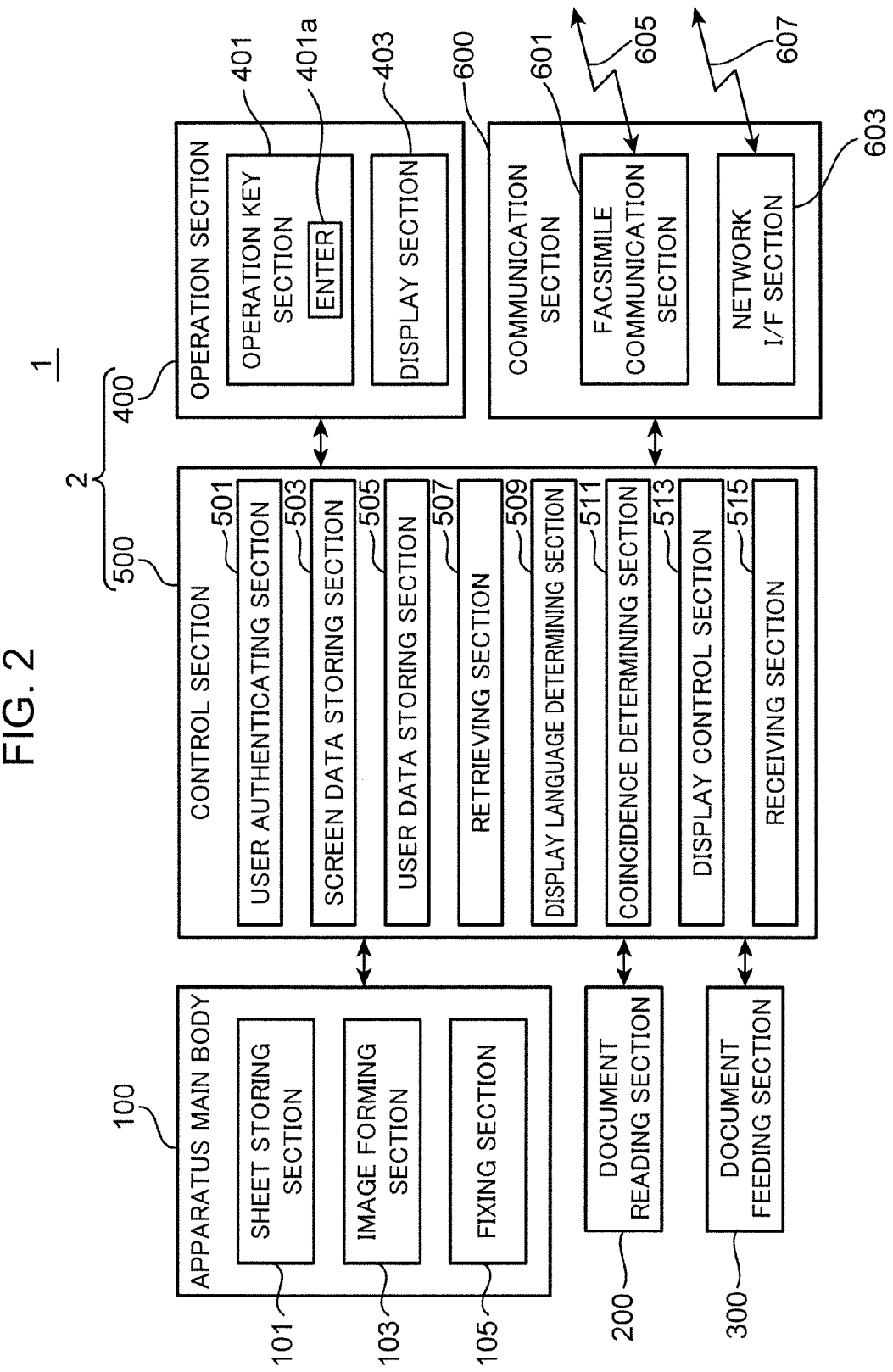
FIG. 2 is a block diagram showing the configuration of the image forming apparatus shown in FIG. 1.

FIG. 2 is a block diagram showing the configuration of the image forming apparatus 1 shown in FIG. 1. The image forming apparatus 1 includes a configuration in which the apparatus main body 100, the document reading section 200, the document feeding section 300, the operation section 400, a control section 500, and a communication section 600 are connected to one another by a bus. Since the apparatus main body 100, the document reading section 200, the document feeding section 300, and the operation section 400 are already explained, explanation thereof is omitted.

The control section 500 includes a CPU (Central Processing Unit), a ROM (Read Only Memory), a RAM (Random Access Memory), and an image memory. The CPU executes, on the components of the image forming apparatus 1 such as the apparatus main body 100, control necessary for causing the image forming apparatus 1 to operate. The ROM has stored therein software necessary for the control of the operation of the image forming apparatus 1. The RAM is used for temporary storage of data generated during execution of the software, storage of application software, and the like. The image memory temporarily stores image data (image data output from the document reading section 200, image data transmitted from the personal computer, image data received by facsimile, etc.).

The communication section 600 includes a facsimile communication section 601 and a network I/F section 603. The facsimile communication section 601 includes an NCU (Network Control Unit) that controls connection of a telephone line to a partner facsimile and a modulation and demodulation circuit that modulates and demodulates a signal for facsimile communication. The facsimile communication section 601 is connected to a telephone line 605.

The network I/F section 603 is connected to a LAN (Local Area Network) 607. The network I/F section 603 is a communication interface circuit for executing communication between the network I/F section 603 and a terminal apparatus such as a personal computer connected to the LAN 607.

A display device 2 according to this embodiment is explained. Referring to FIG. 2, the display device 2 includes the operation section 400 and the control section 500. The control section 500 includes, as functional blocks, a user authenticating section 501, a screen data storing section 503, a user data storing section 505, a retrieving section 507, a display language determining section 509, a coincidence determining section 511, a display control section 513, and a receiving section 515.

When a user inputs a user ID and a password to an authentication screen displayed on the display section 403, the user authenticating section 501 authenticates from the user ID and the password whether the user is a user who can use the image forming apparatus 1. If the user authenticating section 501 authenticates that the user is the user who can use the image forming apparatus 1, the user authenticating section 501 permits the user to use the image forming apparatus 1. If the user authenticating section 501 cannot authenticate that the user is the user who can use the image forming apparatus 1, the user authenticating section 501 does not permit the user to use the image forming apparatus 1.

Figures 3, 4:
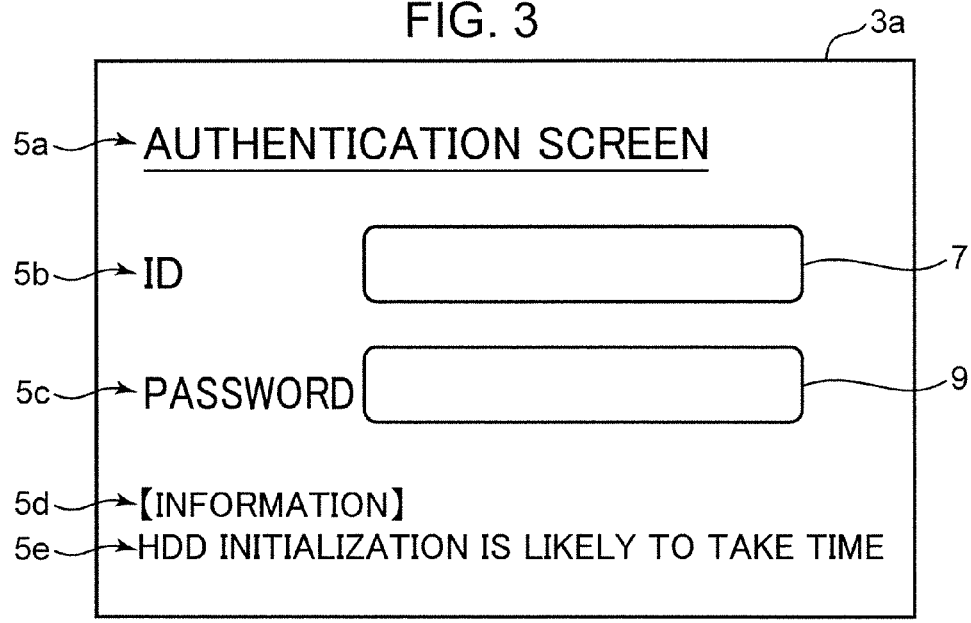
FIG. 3 is a diagram showing a specific example of an authentication screen.
FIG. 4 is a table showing a specific example of user data.

The authentication screen is explained. FIG. 3 is a diagram showing a specific example of an authentication screen 3*a*. In this embodiment, besides the authentication screen 3*a* explained here, there are authentication screens 3*b*, 3*c*, 3*d*, 3*e*, 3*f*, 3*g*, and 3*h* explained below. If it is unnecessary to distinguish the authentication screens 3*a* to 3*h*, the authentication screens 3*a* to 3*h* are described as authentication screens 3.

The authentication screen 3*a* includes character strings 5*a*, 5*b*, 5*c*, 5*d*, and 5*e*, an ID input field 7, and a password input field 9. If it is unnecessary to distinguish the character strings 5*a* to 5*e*, the character strings 5*a* to 5*e* are described as character strings 5.

The character string 5*a* is a character string "authentication screen". The character string 5*b* is a character string "ID". The character string 5*c* is a character string of a password. The character string 5*d* is a character string "information". The character string 5*e* is a character string "HDD initialization is likely to take time". A display language of the authentication screen 3*a* is Japanese. Therefore, characters forming the character strings 5 are Japanese. In this way, the authentication screens 3 including notification items (the character string 5*d* and the character string 5*e*) to the user displayed in a display language of the authentication screens 3 are displayed on the display section 403 by the display control section 513.

If the display language is a language other than Japanese, for example, if the display language is English, the characters forming the character strings 5 are English. If the display language is Korean, the characters forming the character strings 5 are Korean. If the display language is Chinese, the characters forming the character string 5 are Chinese.

An ID of a user is input to the ID input field 7. A password of the user is input to the password input field 9. The ID and the password are input using the operation key section 401 shown in FIG. 2. The operation key section 401 functions as a character input section for inputting characters to the ID input field 7 and the password input field 9.

The authentication screens 3 are respectively prepared for a plurality of display languages. The screen data storing section 503 stores in advance screen data of the authentication screens 3 for the plurality of display languages. For example, if the display languages are Japanese, English, Chinese, and Korean, screen data of the authentication screen 3 for Japanese, screen data of the authentication screen 3 for English, screen data of the authentication screen 3 for Chinese, and screen data of the authentication screen 3 for Korean are stored in the screen data storing section 503 in advance.

User data D is stored in the user data storing section 505 in advance. FIG. 4 is a table showing a specific example of the user data D. The user data D is data obtained by collecting, for each of a plurality of users, data that associates a display language selected by the user out of the plurality of display languages and an ID of the user.

In FIG. 4, "fujimoto" written in lower-case characters of Roman alphabets is specifically shown as the ID of the user and "Japanese" is specifically shown as a display language selected by the user among the plurality of display languages. IDs and display languages of other users are not shown.

In a state in which the authentication screen 3 is displayed on the display section 403, when a predetermined number of characters are input to the ID input field 7 by the operation key section 401, the retrieving section 507 retrieves, from the user data D shown in FIG. 4, an ID including the characters input to the ID input field 7 in order from a first-input. The ID including the characters input to the ID input 7 in order from a first-input, in other words, an ID including a character string formed by characters input so far from a character input to the ID input field 7 first. In the explanation in this embodiment, the predetermined number of characters are two characters. However, the predetermined number of characters may be one character or three or more characters. In a process of inputting an ID to the ID input field 7, the retrieving section 507 executes the retrieval every time two characters are input to the ID input field 7 by the operation key section 401.

The input of characters is specifically explained using the ID "fujimoto" as an example. When "fu" is input to the ID input field 7, the retrieving section 507 retrieves, from the user data D, an ID including "fu" in order from a first-input. Therefore, in addition to the ID "fujimoto", for example, an ID "fuXXX", an ID "fuAAA", an ID "fuBBB", and an ID "fuCCC" are obtained as a retrieval result.

When "ji" is further input to the ID input field 7 following "fu", the retrieving section 507 retrieves, from the user data D, an ID including "fuji" in order from a first-input. In addition to the ID "fujimoto", for example, an ID "fujiXX", an ID "fujiAAA", and an ID "fujiCC" are obtained as a retrieval result.

When "mo" is further input to the ID input field 7 following "ji", the retrieving section 507 retrieves, from the user data D, an ID including "fujimo" in order from a first-input. In addition to the ID "fujimoto", for example, an ID "fujimoX" is obtained as a retrieval result.

When "to" is further input to the ID input field 7 following "mo", the retrieving section 507 retrieves, from the user data D, an ID including "fujimoto" in order from a first-input. The ID "fujimoto" is obtained as a retrieval result.

Every time the predetermined number of characters are input to the ID input field 7, IDs obtained as a result of the retrieval are set as candidate IDs. The display language determining section 509 determines whether all display languages selected by users having the candidate IDs are the same.

More detailed explanation of this will be provided as follows. In a case where, as a result of the retrieval, the ID "fujimoto", an ID "fuXXX", an ID "fuAAAA", an ID "fuBB", and an ID "fuCCC" are obtained, these IDs are candidate IDs. The display language determining section 509 determines, referring to the user data D shown in FIG. 4, whether all display languages selected by users having the candidate IDs are the same.

When it is determined that all the display languages selected by the users having the candidate IDs are the same, the display language selected by the users having the candidate IDs is set as a first display language.

For example, when all the display languages selected by the users having the candidate IDs are Japanese, Japanese is set as the first display language.

On the other hand, when it is not determined that all the display languages selected by the users having the candidate IDs are the same, a display language used by a largest number of users having the candidate IDs among the display languages selected by the users having the candidate IDs is set as a second display language.

For example, it is assumed that the number of users having the candidate IDs is seven. If five users select Chinese among the display languages selected by the users having the candidate IDs and two users select Japanese, Chinese is set as the second display language.

The coincidence determining section 511 determines whether the display language of the authentication screen 3 displayed on the display section 403 coincides with the first display language.

For example, Japanese is set as the first display language. The coincidence determining section 511 determines whether the display language of the authentication screen 3 displayed on the display section 403 coincides with Japanese.

The display control section 513 displays the authentication screen 3 on the display section 403.

When it is determined that the display language of the authentication screen 3 displayed on the display section 403 coincides with the first language, the display control section 513 continues the display of the authentication screen 3 for the display language displayed on the display section 403.

For example, when the display language of the authentication screen 3 displayed on the display section 403 is Japanese and the first display language is Japanese, the display control section 513 continues the display of the authentication screen 3 for the display language displayed on the display section 403.

When it is not determined that the display language of the authentication screen 3 displayed on the display section 403 coincides with the first display language, the display control section 513 reads out screen data of the authentication screen 3 for the first display language from the screen data storing section 503 and causes the display section 403 to display the authentication screen 3 for the first display language instead of the authentication screen 3 for the display language displayed on the display section 403.

For example, when the display language of the authentication screen 3 displayed on the display section 403 is Korean and the first display language is Japanese, the display control section 513 causes the display section 403 to display the authentication screen 3 for Japanese instead of the authentication screen 3 for Korean.

The coincidence determining section 511 determines whether the display language of the authentication screen 3 displayed on the display section 403 coincides with the second display language.

For example, Chinese is set as the second display language. The coincidence determining section 511 determines whether the display language of the authentication screen 3 displayed on the display section 403 coincides with Chinese.

When it is determined that the display language of the authentication screen 3 displayed on the display section 403 coincides with the second display language, the display control section 513 continues the display of the authentication screen 3 for the display language displayed on the display section 403.

For example, when the display language of the authentication screen 3 displayed on the display section 403 is Chinese and the second display language is Chinese, the display control section 513 continues the display of the authentication screen 3 for the display language displayed on the display section 403.

When it is not determined that the display language of the authentication screen 3 displayed on the display section 403 coincides with the second display language, the display control section 513 reads out screen data of the authentication screen 3 for the second display language from the screen data storing section 503 and causes the display section 403 to display the authentication screen 3 for the second display language, instead of the authentication screen 3 for the display language displayed on the display section 403.

For example, when the display language of the authentication screen 3 displayed on the display section 403 is Korean and the second display language is Chinese, the display control section 513 causes the display section 403 to display the authentication screen 3 for Chinese instead of the authentication screen 3 for Korean.

The receiving section 515 receives operation for deciding the ID input to the ID input field 7. When the input of the ID to the ID input field 7 is completed, the user presses an enter key 401a provided in the operation key section 401 shown in FIG. 1. Consequently, the receiving section 515 receives the operation for deciding the ID input to the ID input field 7. The receiving section 515 shifts to a state in which a password can be input to the password input field 9.

In a state in which the authentication screen 3 for the second display language is displayed on the display section 403, when the ID input to the ID input field 7 is decided, the display control section 513 switches in order the authentication screen 3 for the second display language and the authentication screen 3 for the display language other than the second display language selected by the users having the candidate IDs and causes the display section 403 to repeatedly display the authentication screens 3 for the second display language and the display language other than the second display language.

For example, since the number of the users having the candidate IDs is seven, five users select Chinese, and two users select Japanese, the second display language is Chinese. In a state in which the authentication screen 3 for Chinese is displayed on the display section 403, when the ID input to the ID input field 7 is decided, the display control section 513 switches in order the authentication screen 3 for Chinese and the authentication screen 3 for Japanese and causes the display section 403 to repeatedly display the authentication screens 3.

Figure 5:
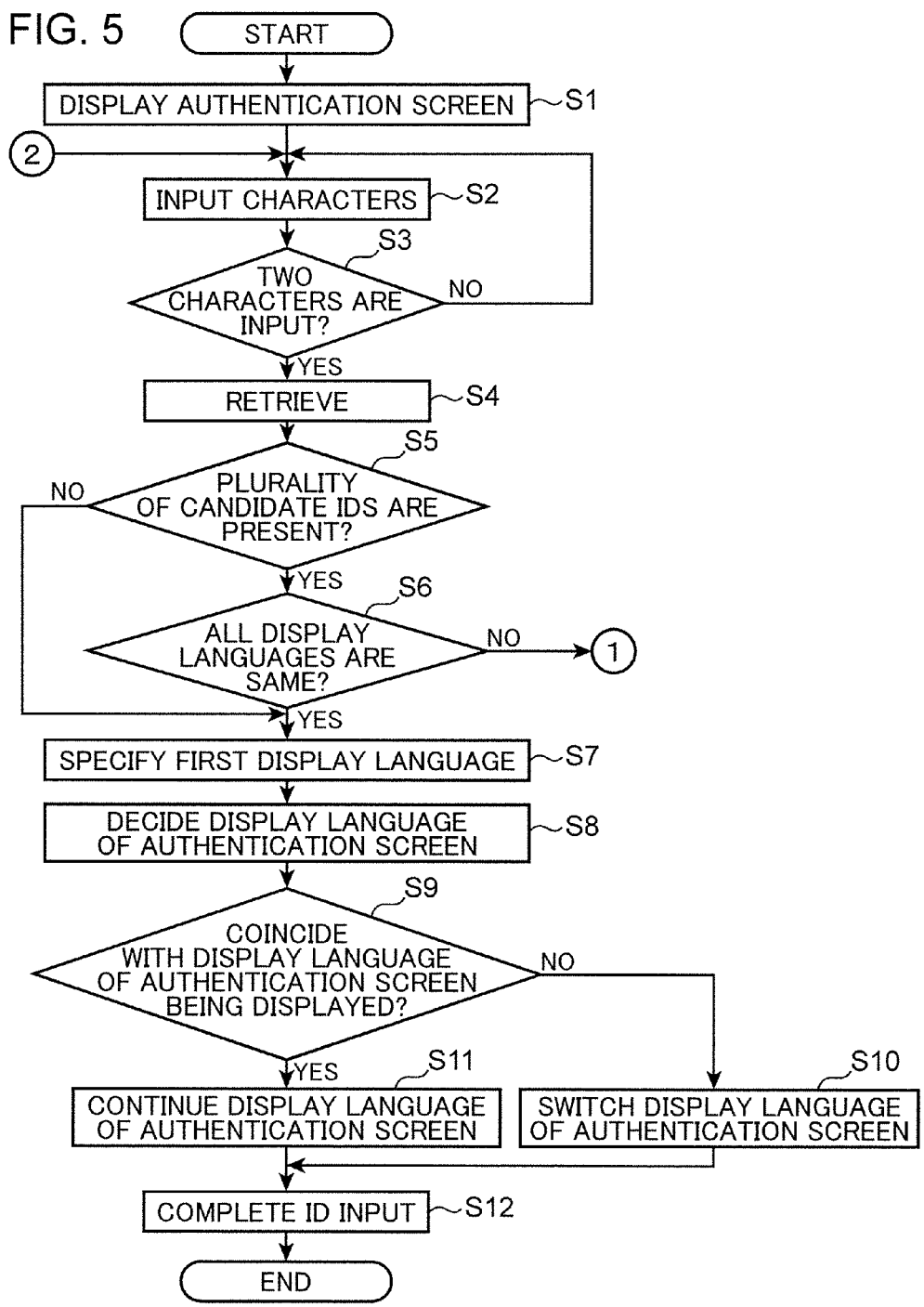
FIG. 5 is a first flowchart for explaining the operation of the display device according to the embodiment.
Figure 6:
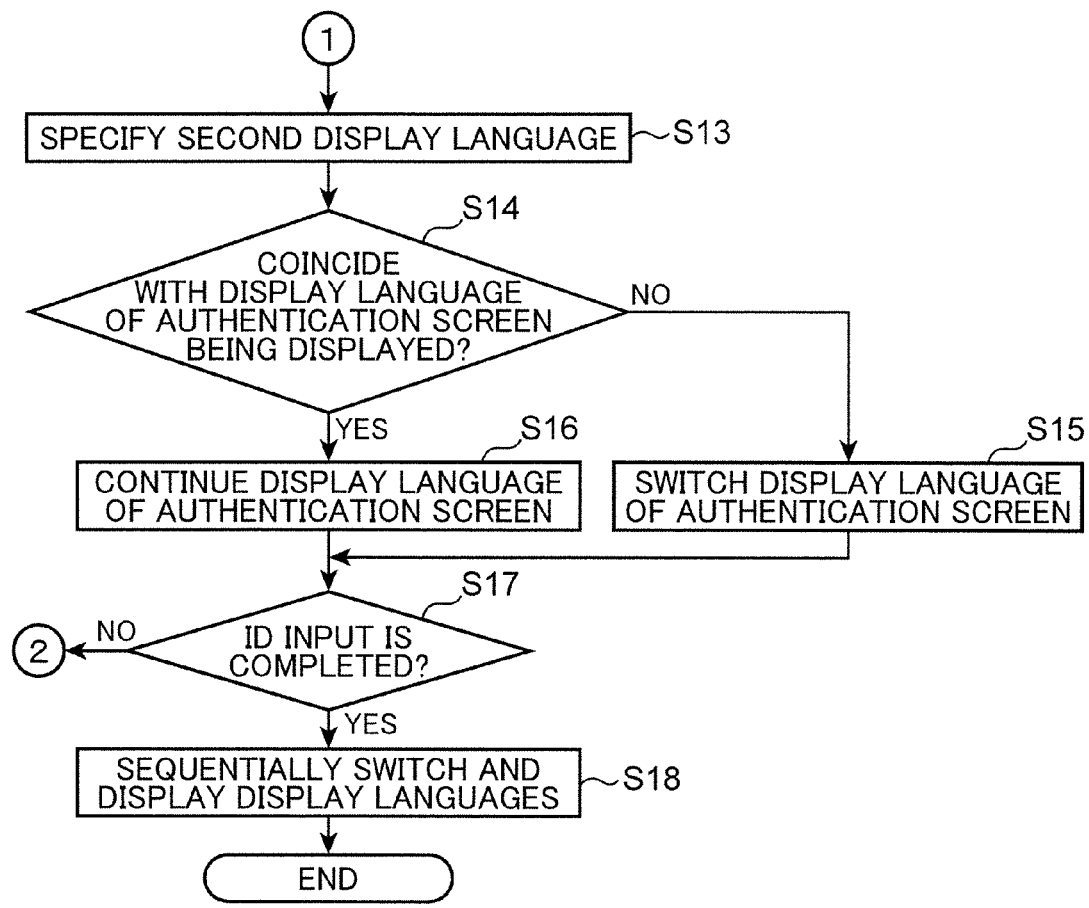
FIG. 6 is a second flowchart for explaining the operation of the display device according to the embodiment.

The operation of the display device 2 according to this embodiment is explained. FIG. 5 and FIG. 6 are flowcharts for explaining the operation. FIG. 7 to FIG. 12 respectively show the authentication screens 3b, 3c, 3d, 3e, 3f, and 3g displayed on the display section 403. The authentication screens 3b to 3g have configurations same as the configuration of the authentication screen 3a shown in FIG. 3. The character strings 5a, 5b, 5c, 5d, and 5e, the ID input field 7, and the password input field 9 are included in the authentication screens 3b to 3g.

Figure 7:
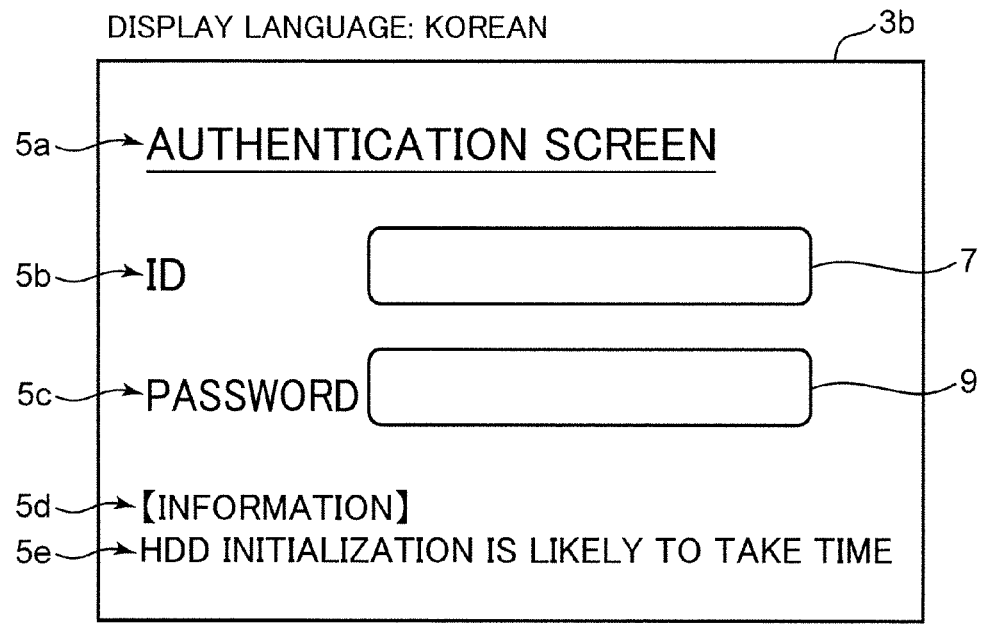
FIG. 7 is a first explanatory diagram for explaining transition of an authentication screen.
Figure 10:
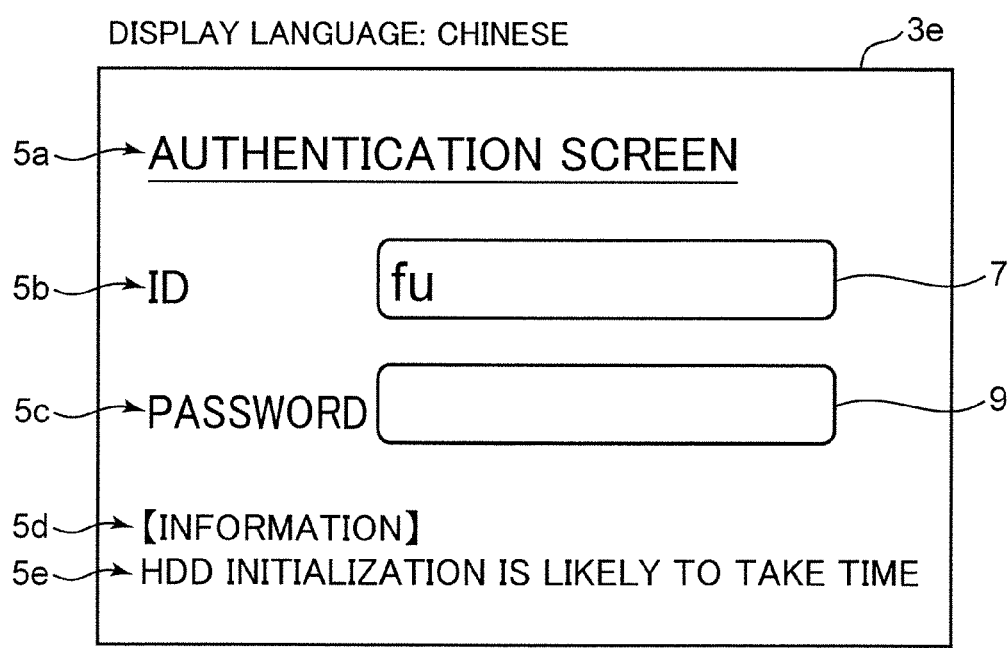
FIG. 10 is a fourth explanatory diagram for explaining transition of an authentication screen.

Referring to FIG. 7, the display control section 513 causes the display section 403 to display the authentication screen 3b in which the ID input field 7 and the password input field 9 are blank (step S1). It is assumed that a display language of the authentication screen 3b is, for example, Korean. In FIG. 7, characters are written in Japanese. However actually, the characters are written in a language of the display language described on the upper left of the figure. Therefore, characters forming the character string 5 of the authentication screen 3b are Korean rather than Japanese. The same applies to FIG. 8, FIG. 10, and FIG. 11 explained below. Although characters are written in Japanese, it is assumed that, actually, the characters are written in a language of the display language written on the upper left of the figures. For example, characters forming the character string 5 of the authentication screen 3e in FIG. 10 are Chinese rather than Japanese.

The user operates the operation key section 401 (the character input section) shown in FIG. 2 and inputs an ID of the user to the ID input field 7. The input of the ID is explained using "fujimoto", the user ID of which is written in lowercase characters of Roman alphabets, as an example. First, the user inputs a Roman alphabet "f" (step S2).

The retrieving section 507 determines that characters input to the ID input field 7 reach two characters (step S3). When the retrieving section 507 determines that the characters input to the ID input field 7 do not reach two characters (No in step S3), that is, when one character is input to the ID input field 7, the processing returns to step S2.

Figure 8:
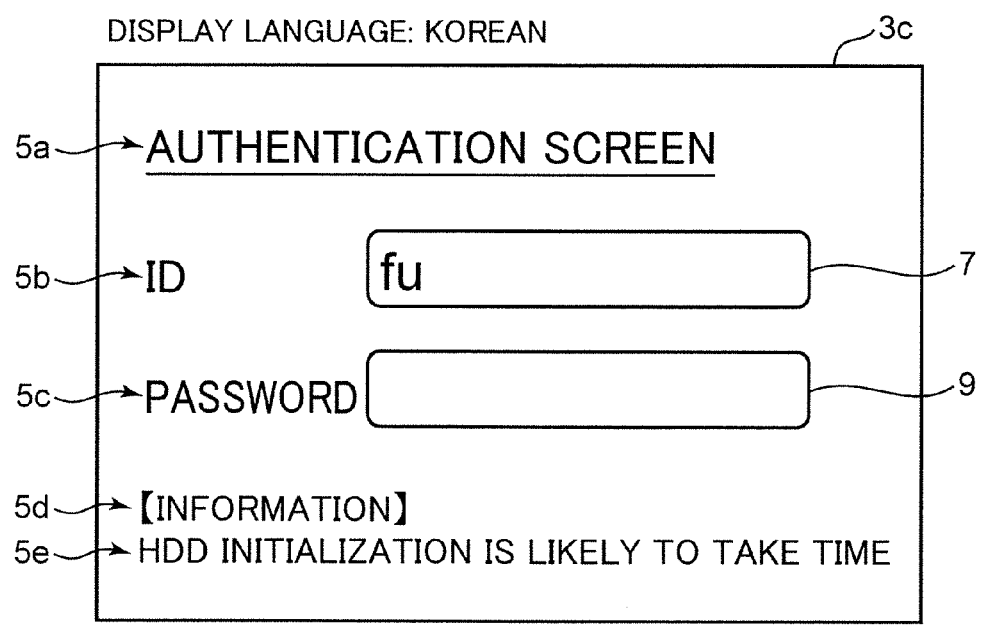
FIG. 8 is a second explanatory diagram for explaining transition of an authentication screen.

Referring to FIG. 8, subsequently, the user inputs a Roman alphabet "u" (step S2). A display language of the authentication screen 3c is still Korean. The retrieving section 507 determines whether the characters input to the ID input field 7 reach two characters (step S3). When determining that the characters input to the ID input field 7 reach two characters (Yes in step S3), the retrieving section 507 executes retrieval (step S4).

The retrieving section 507 retrieves, from the user data D, an ID including, in order from a first-input, characters input to the ID input field 7 in order. The retrieving section 507 retrieves, from the user data D shown in FIG. 4, an ID including "fu" in order from a first-input.

The display language determining section 509 sets, as candidate IDs, IDs obtained as a result of the retrieval in step S4 and determines, referring to the user data D shown in FIG. 4, whether a plurality of users having the candidate IDs are present (step S5).

It is assumed that the user data D includes, besides the ID "fujimoto", for example, an ID "fuXXX", an ID "fuAAAA", an ID "fuBB", and an ID "fuCCC". The ID "fujimoto", the ID "fuXXX", the ID "fuAAAA", the ID "fuBB", and the ID "fuCCC" are obtained as a retrieval result. In this case, a plurality of users having the candidate IDs are present.

It is assumed that the user data D does not include, besides the ID "fujimoto", an ID including "fu" in order from a first-input. Only the ID "fujimoto" is obtained as a retrieval result. In this case, one user having the candidate ID is present rather than a plurality of users.

When the display language determining section 509 determines that a plurality of users having the candidate IDs are present (Yes in step S5), the display language determining section 509 determines, referring to the user data D shown in FIG. 4, whether all display languages selected by the users having the candidate IDs are the same (step S6).

It is assumed that, as a result of the retrieval, as explained above, the ID "fujimoto", the ID "fuXXX", the ID "fuAAAA", the ID "fuBB", and the ID "fuCCC" are obtained. The display language determining section 509 determines, referring to the user data D, whether all display languages selected by the users having the candidate IDs are the same.

When the display language determining section 509 determines that all the display languages selected by the users having the candidate IDs are the same (Yes in step S6), the display language selected by the users having the candidate IDs is set as a first display language (step S7). When all the display languages selected by the users having the candidate ID are, for example, Japanese, Japanese is set as the first display language.

Since the first display language is a use language of the user, thereafter, the retrieval by the retrieving section 507 (step S4) is not executed. That is, before the input of characters configuring the ID to the ID input field 7 is completed (step S12), when the display language determining section 509 determines that all the display languages selected by the users having the candidate IDs are the same (Yes in step S6), whereby the first display language is specified (step S7), the retrieving section 507 stops performing the retrieval concerning the remaining characters configuring the ID every time the predetermined number of characters are input to the ID input field 7. Consequently, it is possible to eliminate useless retrieval.

Note that, when the display language determining section 509 does not determine in step S5 that a plurality of users having the candidate IDs are present (No in step S5), that is, when one user having the candidate ID is present, a display language selected by the user is the first display language.

Since there is no candidate to be the display language of the authentication screen 3 other than the first display language, the display language determining section 509 decides the first display language as the display language of the authentication screen (step S8).

The coincidence determining section 511 determines whether the display language of the authentication screen 3c shown in FIG. 8 coincides with the first display language (step S9). For example, Japanese is set as the first display language. The coincidence determining section 511 determines whether the display language of the authentication screen 3c shown in FIG. 8 coincides with Japanese.

Since the display language of the authentication screen 3 shown in FIG. 8 is Korean, it is not determined that the display language coincides with Japanese (the first display language) (No in step S9). The display control section 513 reads out, referring to FIG. 9, screen data of the authentication screen 3d for Japanese (the first display language) from the screen data storing section 503 and causes the display section 403 to display the screen data instead of the authentication screen 3c for the display language displayed on the display section 403 (step S10).

Note that, when it is determined that the display language of the authentication screen 3c shown in FIG. 8 coincides with the first display language (Yes in step S9), the display control section 513 continues the display of the authentication screen 3c for the display language displayed on the display section 403 (step S11). In other words, when it is determined that the display language of the authentication screen 3c displayed on the display section 403 coincides with the first display language, the display control section 513 performs control for not switching the display language of the authentication screen 3c displayed on the display section 403.

Figure 9:
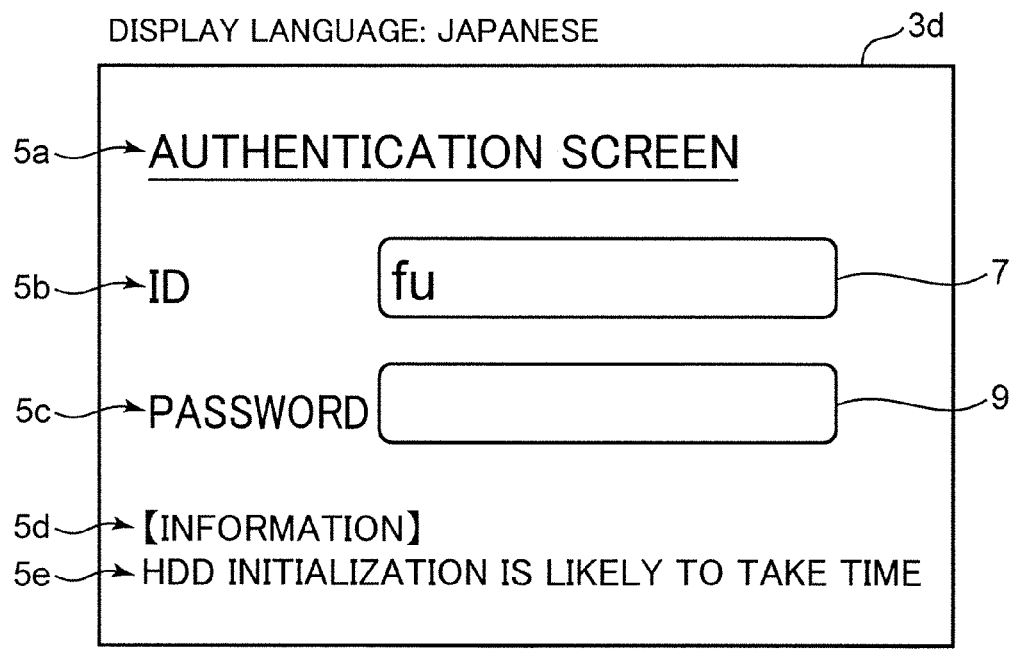
FIG. 9 is a third explanatory diagram for explaining transition of an authentication screen.

The user operates the operation key section 401 and inputs the remaining characters "jimoto" to the ID input field 7 of the authentication screen 3d for Japanese shown in FIG. 9. The user presses the enter key 401a shown in FIG. 2, whereby the receiving section 515 determines that the ID input is completed (step S12) and shifts to a state in which characters can be input to the password input field 9.

When the display language determining section 509 does not determine in step S6 that all the display languages selected by the users having the candidate IDs are the same (No in step S6), a display language used by a largest number of users having the candidate IDs among the display languages selected by the users having the candidate IDs is set as a second display language (step S13). At this point in time, the authentication screen 3c for Korean shown in FIG. 8 is displayed on the display section 403. Since one display language cannot be specified, the second display language is a provisional display language.

For example, it is assumed that the number of users having the candidate IDs is seven. If five users select Chinese and two users select Japanese among the display languages selected by the users having the candidate IDs, Chinese is set as the second display language.

The coincidence determining section 511 determines whether the display language of the authentication screen 3c shown in FIG. 8 coincides with the second display language (step S14).

Since the display language of the authentication screen 3 shown in FIG. 8 is Korean, it is not determined that the display language of the authentication screen 3 coincides with Chinese (the second display language) (No in step S14). The display control section 513 reads out, referring to FIG. 10, screen data of the authentication screen 3e for Chinese (the second display language) from the screen data storing section 503 and causes the display section 403 to display the screen data instead of the authentication screen 3c for the display language displayed on the display section 403 (step S15).

Note that, when it is determined that the display language of the authentication screen 3c shown in FIG. 8 coincides with the second display language (Yes in step S14), the display control section 513 continues the display of the authentication screen 3c for the display language displayed on the display section 403 (step S16). In other words, when it is determined that the display language of the authentication screen 3c displayed on the display section 403 coincides with the second display language, the display control section 513 performs control for not switching the display language of the authentication screen 3c displayed on the display section 403.

The receiving section 515 determines whether the ID input is completed (step S17). That is, the receiving section 515 determines whether the user, who inputs the ID to the ID input field 7, enters the enter key 401a shown in FIG. 2.

Referring to FIG. 10, since only "fu" is input to the ID input field 7 (No in step S17), the processing returns to step S2.

Figure 11:
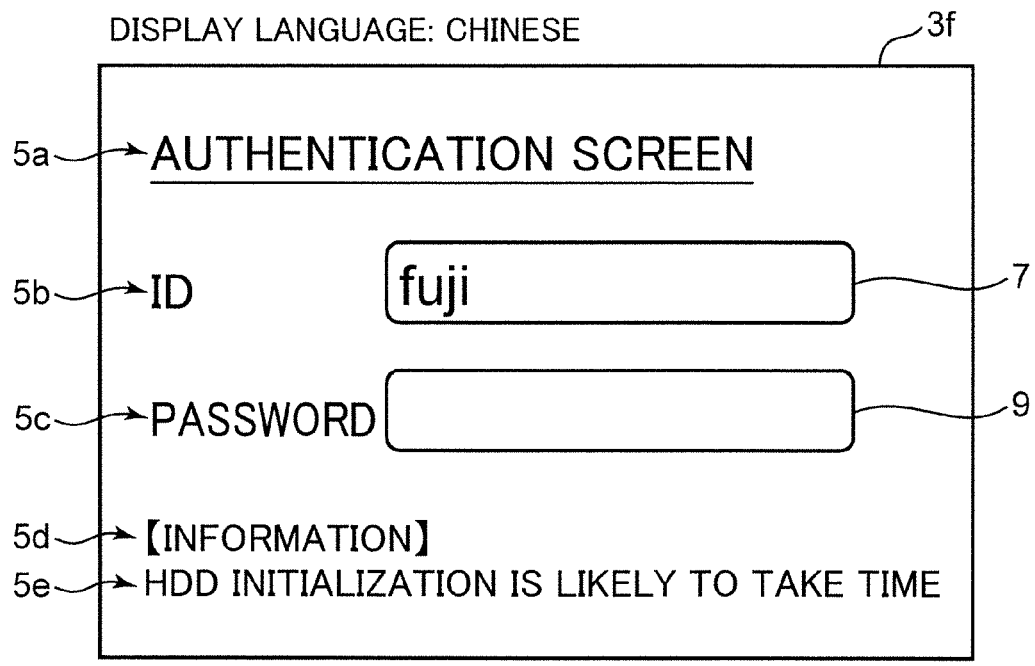
FIG. 11 is a fifth explanatory diagram for explaining transition of an authentication screen.

Referring to FIG. 11, when the user operates the operation key section 401 (the character input section) shown in FIG. 2, whereby "j" and "i" are continuously input to the ID input field 7 following "fu" (Yes in step S3), the retrieving section 507 retrieves, from the user data D, an ID including "fuji" in order from a first-input (step S4).

After step S5, in step S6, when the display language determining section 509 determines that all the display languages selected by the users having the candidate IDs are the same (Yes in step S6), the processing in step S7 and subsequent steps explained above is performed.

On the other hand, when the display language determining section 509 does not determine in step S6 that all the display languages selected by the users having the candidate IDs are the same (No in step S6), a display language used by a largest number of users having the candidate IDs among the display languages selected by the users having the candidate IDs is set as the second display language (step S13).

For example, if the number of users having the candidate IDs decreases from seven to three, two users select Japanese, and one user selects Chinese, Japanese is set as the second display language. At this point in time, the authentication screen 3f for Chinese shown in FIG. 11 is displayed on the display section 403.

The coincidence determining section 511 determines whether a display language of the authentication screen 3f shown in FIG. 11 coincides with the second display language (step S14).

Since the display language of the authentication screen 3f shown in FIG. 11 is Chinese, it is not determined that the display language of the authentication screen 3f coincides with Japanese (the second display language) (No in step S14). The display control section 513 reads out, referring to FIG. 12, image data of the authentication screen 3g for Japanese (the second display language) from the screen data storing section 503 and causes the display section 403 to display the screen data of the authentication screen 3g instead of the authentication screen 3f for the display language displayed on the display section 403 (step S15).

The receiving section 515 determines whether the ID input is completed (step S17).

Figure 12:
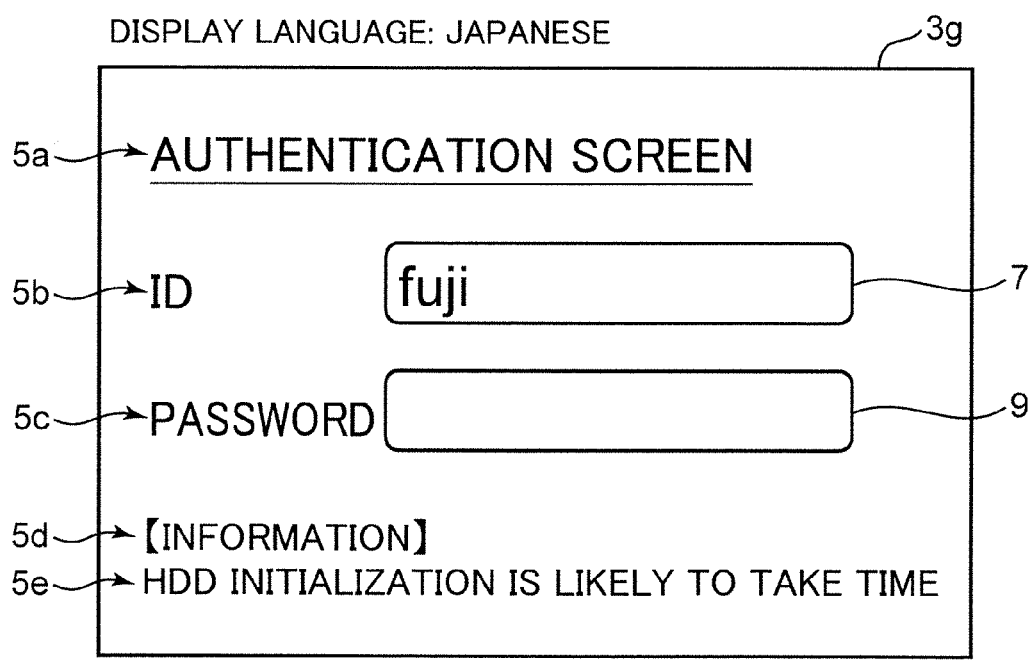
FIG. 12 is a sixth explanatory diagram for explaining transition of an authentication screen.

Referring to FIG. 12, since only "fuji" is input to the ID input field 7 (No in step S17), the processing returns to step S2. Thereafter, the processing in step S2 and subsequent steps explained above is performed.

The user completes the input of the ID to the ID input field 7 and presses the enter key 401a. Consequently, the receiving section 515 determines that the ID input is completed (Yes in step S17). In this case, a state occurs in which two or more users having the ID "fujimoto" are present and display languages selected by the users are not common and are two or more. This is because, as explained above, when the display language determining section 509 does not determine that all the display languages selected by the users having the candidate IDs are the same (No in step S6), a display language used by a largest number of users having the candidate IDs among the display languages selected by the users having the candidate IDs is set as the second display language (step S13).

It is assumed that, when it is determined No in step S6, the display languages selected by the users having the candidate IDs are, for example, Chinese and Japanese. In this case, the display control section 513 switches the authentication screen 3 for Chinese and the authentication screen 3 for Japanese in order and causes the display section 403 to repeatedly display the authentication screens 3 (step S18).

Processing of switching from the authentication screen 3 for the second display language to the authentication screen 3 for the first display language is briefly explained. Before the input of all the characters configuring the ID to the ID input field 7 is completed (No in step S17), when the authentication screen 3 for the second display language is displayed on the display section 403 by the display control section 513 (steps S15 and S16), the retrieving section 507 continues, concerning the remaining characters configuring the ID, the retrieval every time the predetermined number of characters are input to the ID input field 7 (steps S2, S3, and S4).

In the state in which the authentication screen 3 for the second display language is displayed on the display section 403, when determining that all the display languages selected by the users having the candidate IDs are the same (Yes in step S6), the display language determining section 509 sets the display language selected by the users having the candidate IDs as a first display language (step S7).

When it is not determined that the second display language coincides with the first display language (No in step S9), the display control section 513 reads out the screen data of the authentication screen 3 for the first display language from the screen data storing section 503 and causes the display section 403 to display the authentication screen 3 for the first display language instead of the authentication screen 3 for the second display language displayed on the display section 403 (step S10).

In this way, concerning the display language of the authentication screen 3, it is possible to switch the second display language, which is the provisional display language, to the first display language, which is the use language of the user.

Main effects of this embodiment are explained. In this embodiment, in a state in which the authentication screen 3 having any one of the plurality of display languages as the display language is displayed, every time the predetermined number of characters (two characters) are input to the ID input field 7, an ID including, in order from a first-input, characters input to the ID input field 7 in order is retrieved from the user data D (step S4). IDs obtained as a result of the retrieval are set as candidate IDs. When all display languages selected by users having the candidate IDs are the same (Yes in step S6), the display language selected by the users of the candidate IDs is set as a first display language (step S7). When the display language of the authentication screen 3 being displayed does not coincide with the first display language (No in step S9), the authentication screen 3 for the first display language is displayed instead of the authentication screen 3 being displayed.

As explained above, according to this embodiment, even before the input of the ID to the ID input field 7 is completed, it is possible to switch the display language of the authentication screen 3 to the authentication screen 3 for the display language selected by the user. Therefore, it is possible to switch the display language of the authentication screen 3 to the display language selected by the user, that is, the use language of the user as early as possible.

According to this embodiment, when all the display languages selected by the users having the candidate IDs are not the same (No in step S6), that is, when the display languages selected by the users having the candidate IDs are two or more kinds, a display language used by a largest number of users having the candidate IDs among the display languages selected by the users having the candidate IDs is set as a second display language (step S13). When the display language of the authentication screen 3 being displayed does not coincide with the second display language (No in step S14), the authentication screen 3 for the second display language is displayed instead of the authentication screen 3 being displayed (step S15).

Since the second display language is used by the largest number of users having the candidate IDs, it is highly likely that the second display language is a display language selected by the user who inputs the ID to the ID input field 7. Therefore, according to this embodiment, even before the input of the ID to the ID input field 7 is completed, it is possible to switch the display language of the authentication screen 3 to the display language, which is highly likely to be the display language selected by the user.

In this embodiment, in the state in which the authentication screen 3 for the second display language is displayed (steps S13, S14, S15, and S16), one display language selected by the user who inputs the ID cannot be decided and any one of two or more kinds of display languages is the display language selected by the user. In the state in which the authentication screen 3 for the second display language is displayed, when the input of the ID to the ID input field 7 is completed and operation for deciding the ID is performed (Yes in step S17), one display language selected by the user cannot be decided. In such a case, the authentication screen 3 for the second display language and the authentication screen 3 for the display language other than the second display language selected by the users having the candidate IDs are switched in order and repeatedly displayed (step S18). Therefore, the user who inputs the ID can understand contents of notification items indicated by reference signs 5d and 5e displayed on the authentication screen 3.

Further, in this embodiment, before a password is input to the password input field 9, the retrieving section 507 performs the retrieval in step S4. This means that the retrieving section 507 executes the retrieval at a stage in which the password input field 9 is blank and the ID is input to the ID input field 7. Therefore, before an input of a password to the password input field 9 is started, it is possible to switch the display language of the authentication screen 3 to the display language selected by the user. Therefore, it is possible to switch the display language of the authentication screen 3 to the use language of the user as early as possible.

A modification of this embodiment is explained with reference to FIG. 13 and FIG. 14. FIG. 14 is a block diagram showing the configuration of an image forming apparatus 21 including a display device 22 according to the modification. The image forming apparatus 21 is different from the image forming apparatus 1 shown in FIG. 2 in that a display language fixing section 517 is further provided in the control section 500.

Figure 13:
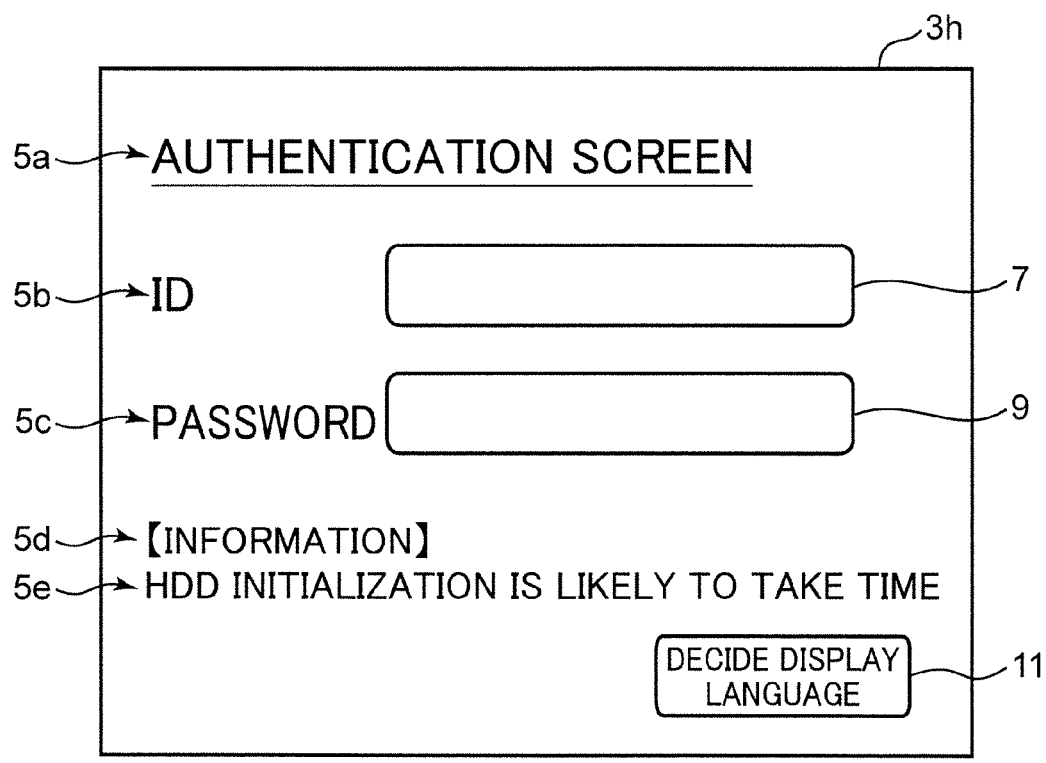
FIG. 13 is a diagram showing a specific example of an authentication screen displayed on a display section in a modification of the embodiment.

FIG. 13 is a diagram showing a specific example of an authentication screen 3h displayed on the display section 403 shown in FIG. 14 in the display device 22 according to the modification. The authentication screen 3h is different from the authentication screen 3a shown in FIG. 3 in that the authentication screen 3h further includes a display language fixing button 11.

In a state in which the authentication screen 3h is displayed on the display section 403, when the display language fixing button 11 is pressed, the display language fixing section 517 fixes, as the display language of the authentication screen 3, a display language of the authentication screen 3h being displayed and stops the retrieval of the retrieving section 507.

Before the operation for deciding the ID input to the ID input field 7 is performed, if the display language of the authentication screen 3 is the use language of the user, the user presses the display language fixing button 11. Consequently, the display language of the authentication screen 3 is fixed. Therefore, it is possible to prevent the display language of the authentication screen 3 from being switched in a process in which the remaining characters configuring the ID are input to the ID input field 7. That is, in a state in which the display language of the authentication screen 3 is the display language selected by the user who inputs the ID, it is possible to prevent the authentication screen 3 from changing to the authentication screen 3 for a display language different from the display language of the authentication screen.

In this embodiment, the input of the password is performed after the input of the ID is completed. However, the input of the ID and the password is not limited to this. The ID and the password may be simultaneously input.

The invention claimed is:

1. A display device comprising:
   a display section on which an authentication screen including an ID input field is displayed;
   a display control section that causes the display section to display the authentication screen;
   a screen data storing section that, with the authentication screen being prepared for each of a plurality of display languages, stores in advance screen data of the authentication screen for each of the plurality of display languages;
   a user data storing section that stores in advance user data obtained by collecting, for each of a plurality of users, data that associates a display language selected by a user out of the plurality of display languages and an ID of the users;
   a character input section for inputting a character to the ID input field;
   a retrieving section that retrieves from the user data, in a state in which the authentication screen is displayed on the display section, before the input of the ID to the ID input field is completed and every time a predetermined number of characters are input to the ID input field by the character input section, the ID including the characters input to the ID input field in order from a first-input;
   a display language determining section that sets, as candidate IDs, the IDs obtained as a result of the retrieval and determines whether all the display languages selected by the users having the candidate IDs are the same; and
   a coincidence determining section that sets, when determination is made that all the display languages selected by the users having the candidate IDs are the same, the display language selected by the users having the candidate IDs as a first display language, and determines whether a display language of the authentication screen displayed on the display section coincides with the first display language, wherein
   when determination is not made that the display language of the authentication screen displayed on the display section coincides with the first display language, the display control section reads out, from the screen data storing section, the screen data of the authentication screen for the first display language and causes the display section to display the authentication screen for the first display language, in place of the authentication screen for the display language displayed on the display section.

2. The display device according to claim 1, wherein
   when it is not determined by the display language determining section that all the display languages selected by the users having the candidate IDs are the same, a display language used by a largest number of users having the candidate IDs among the display languages selected by the users having the candidate IDs is set as a second display language,
   the coincidence determining section determines whether the display language of the authentication screen displayed on the display section coincides with the second display language, and
   when determination is not made that the display language of the authentication screen displayed on the display section coincides with the second display language, the display control section reads out, from the screen data storing section, screen data of the authentication screen for the second display language and causes the display section to display the authentication screen for the second display language, in place of the authentication screen for the display language displayed on the display section.

3. The display device according to claim 2, further comprising a receiving section that receives operation for determining the ID that has been input to the ID input field, wherein
   in a state in which the authentication screen for the second display language is displayed on the display section, when the ID input to the ID input field is determined, the display control section implements switching in order between the authentication screen for the second display language and the authentication screen for the display language other than the second display language selected by the users having the candidate IDs and causes the display section to repeatedly display the authentication screens for the second display language and the display language other than the second display language.

4. The display device according to claim 1, further comprising:
   a display language fixing button; and
   a display language fixing section that fixes, before operation for determining the ID that has been input to the ID input field is performed and, in a state in which the authentication screen is displayed on the display section, when the display language fixing button is depressed, the display language of an authentication screen, which is being displayed, as the display language of the authentication screen and causes the retrieving section to stop the retrieval.

5. The display device according to claim 1, wherein
   the authentication screen includes a password input field, and
   the retrieving section performs the retrieval before a password is input to the password input field by the character input section.

6. The display device according to claim 2, wherein
   before an input of all characters configuring the ID to the ID input field is completed, when the authentication screen for the second display language is displayed on the display section by the display control section, the retrieving section continues the retrieval of remaining characters configuring the ID every time the predetermined number of characters are input to the ID input field,
   in a state in which the authentication screen for the second display language is displayed on the display section, when determining that all the display languages selected by the users having the candidate IDs are the same, the display language determining section sets, as the first display language, the display language selected by the users having the candidate IDs, and
   when determination is not made that the second display language coincides with the first display language, the display control section reads out, from the screen data storing section, screen data of the authentication screen for the first display language and causes the display section to display the authentication screen for the first display language, in place of the authentication screen for the second display language displayed on the display section.

7. The display device according to claim 1, wherein, before an input of all characters configuring the ID to the ID input field is completed, when determination is made by the display language determining section that all the display languages selected by the users having the candidate IDs are the same, and whereby the first display language is specified, the retrieving section stops the retrieval of remaining characters configuring the ID every time the predetermined number of characters are input to the ID input field.

8. The display device according to claim 1, wherein, when determination is made that the display language of the authentication screen displayed on the display section coincides with the first display language, the display control section performs control for not switching the display language of the authentication screen displayed on the display section.

9. The display device according to claim 2, wherein, when determination is made that the display language of the authentication screen displayed on the display section coincides with the second display language, the display control section performs control for not switching the display language of the authentication screen displayed on the display section.

10. The display device according to claim 1, wherein the display control section causes the display section to display the authentication screen including a notification item to the user displayed in the display language of the authentication screen.

11. An image forming apparatus comprising:
an operation section configured by the display device according to claim 1; and
a user authenticating section that authenticates, from the ID of the user input to the ID input field, whether the user is a user who can use the image forming apparatus and, when authenticating the user as the user who can use the image forming apparatus, permits the user to use the image forming apparatus and, when not authenticating the user as the user who can use the image forming apparatus, does not permit the user to use the image forming apparatus.

12. A display device comprising:
a display section on which an authentication screen including an ID input field is displayed;
a display control section that causes the display section to display the authentication screen;
a screen data storing section that, with the authentication screen being prepared for each of a plurality of display languages, stores in advance screen data of the authentication screen for each of the plurality of display languages;
a user data storing section that stores in advance user data obtained by collecting, for each of a plurality of users, data that associates a display language selected by a user out of the plurality of display languages and an ID of the users;
a character input section for inputting a character to the ID input field;
a retrieving section that retrieves from the user data, in a state in which the authentication screen is displayed on the display section, every time a predetermined number of characters are input to the ID input field by the character input section, the ID including the characters input to the ID input field in order from a first-input;
a display language determining section that sets, as candidate IDs, the IDs obtained as a result of the retrieval and determines whether all the display languages selected by the users having the candidate IDs are the same; and
a coincidence determining section that sets, when determination is made that all the display languages selected by the users having the candidate IDs are the same, the display language selected by the users having the candidate IDs as a first display language, and determines whether a display language of the authentication screen displayed on the display section coincides with the first display language, wherein when determination is not made that the display language of the authentication screen displayed on the display section coincides with the first display language, the display control section reads out, from the screen data storing section, the screen data of the authentication screen for the first display language and causes the display section to display the authentication screen for the first display language, in place of the authentication screen for the display language displayed on the display section, when it is not determined by the display language determining section that all the display languages selected by the users having the candidate IDs are the same, a display language used by a largest number of users having the candidate IDs among the display languages selected by the users having the candidate IDs is set as a second display language, the coincidence determining section determines whether the display language of the authentication screen displayed on the display section coincides with the second display language, and when determination is not made that the display language of the authentication screen displayed on the display section coincides with the second display language, the display control section reads out, from the screen data storing section, screen data of the authentication screen for the second display language and causes the display section to display the authentication screen for the second display language, in place of the authentication screen for the display language displayed on the display section.

13. The display device according to claim 12, further comprising a receiving section that receives operation for determining the ID that has been input to the ID input field, wherein
in a state in which the authentication screen for the second display language is displayed on the display section, when the ID input to the ID input field is determined, the display control section implements switching in order between the authentication screen for the second display language and the authentication screen for the display language other than the second display language selected by the users having the candidate IDs and causes the display section to repeatedly display the authentication screens for the second display language and the display language other than the second display language.

14. The display device according to claim 12, wherein
before an input of all characters configuring the ID to the ID input field is completed, when the authentication screen for the second display language is displayed on the display section by the display control section, the retrieving section continues the retrieval of remaining characters configuring the ID every time the predetermined number of characters are input to the ID input field,
in a state in which the authentication screen for the second display language is displayed on the display section, when determining that all the display languages selected by the users having the candidate IDs are the same, the display language determining section sets, as the first display language, the display language selected by the users having the candidate IDs, and when determination is not made that the second display language coincides with the first display language, the display control section reads out, from the screen data storing section, screen data of the authentication screen for the first display language and causes the display section to display the authentication screen for the first display language, in place of the authentication screen for the second display language displayed on the display section.

15. The display device according to claim 12, wherein, when determination is made that the display language of the authentication screen displayed on the display section coincides with the second display language, the display control section performs control for not switching the display language of the authentication screen displayed on the display section.

* * * * *